(12) United States Patent
Gorden

(10) Patent No.: US 7,011,579 B2
(45) Date of Patent: Mar. 14, 2006

(54) HIGH CAPACITY AIR JET CHAFFER

(76) Inventor: Marvin James Gorden, P.O. Box 12783, Wichita, OK (US) 67277

( * ) Notice: Subject to any disclaimer, the term of this patent is extended or adjusted under 35 U.S.C. 154(b) by 0 days.

(21) Appl. No.: 10/912,698

(22) Filed: Aug. 5, 2004

(65) Prior Publication Data

US 2005/0009590 A1 Jan. 13, 2005

Related U.S. Application Data

(62) Division of application No. 10/057,615, filed on Jan. 25, 2002, now Pat. No. 6,790,137.

(51) Int. Cl.
*A01F 12/34* (2006.01)
(52) U.S. Cl. ........................................ 460/101
(58) Field of Classification Search ............... 460/101, 460/102; 209/408, 414, 399
See application file for complete search history.

(56) References Cited

U.S. PATENT DOCUMENTS

| 807,355 | A | | 12/1905 | Campbell | |
|---|---|---|---|---|---|
| 1,462,804 | A | * | 7/1923 | Evans | 209/398 |
| 1,617,246 | A | * | 2/1927 | Freeman | 460/10 |
| 2,500,448 | A | * | 3/1950 | Bozarth | 209/416 |
| 3,374,886 | A | | 3/1968 | Lightsey | |
| 4,511,466 | A | | 4/1985 | Jones et al. | |
| 4,897,071 | A | * | 1/1990 | Desnijder et al. | 460/10 |
| 5,041,059 | A | | 8/1991 | Ricketts et al. | |
| 5,125,871 | A | | 6/1992 | Gorden | |
| 5,176,574 | A | | 1/1993 | Matousek et al. | |
| 5,462,174 | A | * | 10/1995 | Truckenbrod et al. | 209/394 |
| 5,588,912 | A | | 12/1996 | Schumacher et al. | |
| 5,944,993 | A | * | 8/1999 | Derrick et al. | 210/388 |
| 6,053,329 | A | * | 4/2000 | Ballman | 209/405 |
| 6,053,812 | A | | 4/2000 | Loewen et al. | |
| 6,379,243 | B1 | | 4/2002 | Schumacher et al. | |

FOREIGN PATENT DOCUMENTS

EP 312 655 4/1989

* cited by examiner

*Primary Examiner*—Meredith C. Petravick
(74) *Attorney, Agent, or Firm*—Barber Legal; Craig Barber

(57) ABSTRACT

A crop chaffer for combines features air jets which deliver an air blast to the grain and chaff. The air jets and sifting screens are arranged in a cross sectionally "stair step" pattern in which the tread of each stair is the screen and the riser of the each stair has the air jet located thereon. The air jets do not allow grain passage, while the apertures in the screens do not produce a strong current of air. The chaffer is divided into individually separable and replaceable elements, thus greatly easing the burden of changing chaffers in the combine.

1 Claim, 7 Drawing Sheets

HIGH CAPACITY AIR JET CHAFFER

CROSS REFERENCE TO RELATED APPLICATION

The application claims the priority and is a divisional of U.S. patent application No. 10/057,615 filed Jan. 25, 2002, now U.S. Pat. No. 6,790,137, in the name of the same inventor, Marvin James Gorden, and entitled HIGH CAPACITY AIR JET CHAFFER, the specification of which is hereby incorporated by reference.

FIELD OF THE INVENTION

This invention relates to generally to agricultural combine use and specifically to an improved chaffing/sieving element.

This application contains no new matter relative to the originally filed application identified above. The following changes have been made in the specification on this page only. This CROSS REFERENCE is added. The FIELD OF THE INVENTION has been very slightly modified.

The CLAIMS presented are taken from the claims 12 through 15 of the originally filed application identified above. A copy of the DECLARATION of the originally filed (parent) application identified above is included under the provisions of MPEP Sec. 602.05(a).

BACKGROUND OF THE INVENTION

Agricultural combines are widely available machines which enormously speed the processes of harvesting, threshing and cleaning of all types of grains. By minimizing the labor required for harvesting, combines have contributed to the dramatic increase in availability and decrease in price of grains.

The combine machine traverses the field of grain in swathes which cover the area of the ripened crop. As it travels, the combine brings grain into its forward end and feeds it to a separating apparatus or thresher which threshes the grain, separating grain and grain heads from stalks, straw, dirt and other undesirable materials. An example of an axial flow rotor for threshing of the grain may be seen in U.S. Pat. No. 5,125,871, issued Jun. 30, 1992, to the same inventor as the present application. The present invention concerns the succeeding processing stage: the chaffing of the grain.

After passing through the threshing stage, the grain is theoretically perfectly threshed. In reality, however, while the separating apparatus is efficient, some chaff, unthreshed grain, other materials, stems, and/or straw remains intermixed with the grain and further steps of threshing, separating and cleaning are normally required.

The cleaning section of a conventional combine is located to receive grain and other material expelled from the separating apparatus. A typical cleaning section includes a chaffer and a sieve mounted so as to move back and forth reciprocally and a fan which produces a flow of air directed through the sieve and chaffer. The sieve is usually mounted below the chaffer, although it important to note that some combines have several layers of sieves and chaffers, or several in sequence. In theory, the chaffer blows the chaff and other "materials other than grain" ("MOG") out of the stream of grain before the sieve sifts it. Reciprocation of the chaffer and sieve facilitates arrangement of the grain and other materials into a crop layer or mat on top of the chaffer. Separation of the crop material is largely facilitated by the air from the fan flowing upwardly through the passages between the louvered sieve and chaffer. Prior art chaffers/sieves include a series of adjacent louvers. A series of transverse elongated openings or passages are defined between the adjacent louvers to grade the material by density and size. Smaller, denser kernels of grain are allowed to fall through the openings despite the airflow upwards therefrom, after which they fall through the sieve mounted below the chaffer, whereas larger pieces of materials are blown or vibrated rearward in the airflow and off of the chaffer and sieve. The light material blown off the chaffer is discharged from the combine entirely, while heavier unthreshed heads of the crop still having grain is too heavy to blow and thus is moved off of the rear of the sieve, from where it is returned by the tailings system to the separating apparatus for rethreshing. Finally, there is larger MOG which is carried over the end of the chaffer and falls or blows away from there.

Thus four categories of material are created: first, the grain, which falls through the chaffer/sieve for storage, second unthreshed material which is sent back for rethreshing, and third chaff, which is blown entirely clear. Fourth, the larger material other than grain is carried off the end of the rethreshing louvers of the chaffer. To allow use of a single chaffer for grain crops of different sizes, the louvers may be adjusted in rotation, thus altering the spacing between the louvers and the characteristics of the air-flow/ air-blast through them.

The proper opening between the louvers is necessary for efficient operation of the combine's chaffer. If the openings are too large, straw and other material ends up falling between them with the grain, contaminating the grain. On the other hand, if the louvers are adjusted to have openings which are too small, the individual grain requires a longer average time before finding a hole of sufficient size to pass through, thus causing a buildup of the grain, thus causing an unpredictable diminishment of the air flow, thus reducing both the speed and the efficiency of operation. Worse, some of the grain is carried off the back of the chaffer and if it falls through the louvers, is returned to the thresher unnecessarily, resulting in an excessive percentage of the grain being cracked, or if it is carried over the louvers ends up falling out the back of the combine and being lost. If the louvers are not evenly adjusted the grain may not receive uniform treatment, and in some areas, the MOG may fall through the chaffer while in others, even grain is blown away.

One particular issue is that the husk surrounding the grain may cling tightly to the grain, especially in a wheat crop, resulting in "white caps": kernels slightly larger than the norm having husk still attached. Adjusting chaffers to use only size in a sifting or filtering apparatus to successfully reject the white caps while accepting the only slightly smaller grains which are fully threshed is a difficult process. The size difference between the chaffed and unchaffed grains can be minute: in wheat, the size difference may be as small as 5/1000 of an inch.

An example of prior art that shows a commonly used louvered system is U.S. Pat. No. 4,511,466, issued Apr. 16, 1985 to Jones et al for "Chaffer Slat". This clearly shows that the grain flow must make a turn in flow direction in order to advance to the clean grain collection system, this turn may be anywhere from 90 degrees to almost 180 degrees, depending upon circumstances. The grain density is greater than that of the chaff, and the grain has more inertia than does the chaff, and this inertia must be overcome in making the turn. Also, in order for the grain to fall through a louver chaffer it must rely on gravity to drop between the louvers and penetrate the blast of air passing in the exact opposite direction. As can be easily appreciated there is a conflict at this point: a powerful blast of air is needed to float the chaff above the chaffer and out the back end of the combine, but the blast must not be so strong as to prevent the grain (which is being driven backwards across the chaffer) from making its turn and falling against that air blast through the louvers to the clean grain collection system. It is also worth noting that while the grain flow path pictured in FIG. 1 of the '466 patent is depicted to closely follow the underside of each louver, in fact gravity and the reciprocating motion of the chaffer causes the grain to actually land upon the top side of the following louver. However, this contact with the topside of the following louver supports the grain and diminishes the effect of gravity in moving the grain downwards against the blast of air. In addition, the MOG tends to comprise a mixture which may include straight stalks of various lengths. With large numbers of such stalks continuously fluttering and twirling in the air blast, it is inevitable that some number of them randomly end up aligned parallel to the air blast. They can then fall with great ease straight into the air blast. The slats pictured by the '466 patent are unlikely to catch and filter out such stalks as the slats are themselves aligned parallel to the airflow, and thus a certain percentage of stalks can simply fall straight through the chaffer to contaminate the grain. One final problem with such devices is that the reciprocating motion of the chaffer/sieve combination tends to "stuff" the lighter, less inertia driven material, (chaff, and other materials other than grain) into the slanted louver openings, contributing to the problem of fouling of the chaffer/sieve.

In such a louver or air foil chaffer system reliance for filtration is on the size of the openings, but in any given crop, the grain varies in size by as much as 100%. The openings of chaffers and sieves must be set wide enough to allow the largest individual grains of the crop to pass through. The opening is then wider than necessary for the smaller grains of the same crop. Any of the smaller grains that have attached husks ("white caps") will pass through and contaminate the clean grain in the collection system. However, it is obvious that as the louvers are adjusted, the angle of the air blast is altered, the speed of the air blast is changed, the amount of support offered to the grains as they slide down the louvers is altered, and numerous other changes occur.

To illustrate the complexity of the mechanics involved, consider the case in which the louvers are narrowed from a fairly wide open configuration which was previously selected to allow a relatively large grained crop to pass there through. The narrowing of the louvers does allow them to function as screens or filters for a smaller size of crop. However, the smaller openings result in an air blast which is potentially more powerful, despite the fact that a smaller and lighter grain must now fight it's way downwards against this blast. The louvers' relatively flat angle means that the louver's top surfaces offer to the smaller grains a greater degree of support, thus reducing the pull of gravity to overcome the air blast. The fan speed must thus be adjusted to attempt to compensate not only for the smaller crop but also for the unpredictable effects of the louvers on that crop. And the new lower angle of the air blast will tend to move the mat of grain and chaff backwards faster.

In systems commercially available, the construction of the chaffer is extremely light: thin metal louvers, supports of light construction, and moving parts having fairly generous tolerances. In addition linkages necessary to actuate the multiple slats must run from the back of the chaffer (where the operator may have access) to the front. The combined effect is to produce an uncertain control response. The loose linkages, multiplied over the length of the chaffer, may result in the louver adjustment at the front end being very different from the louver adjustment at the back end, where the operator can easily see it. Individual slats may be warped by fatigue or bent by MOG falling onto them from the separator. In some commercially available systems, the length of the chaffer is divided up into multiple zones, each having a separate control system, in an attempt to deal with these problems.

The sieve below the chaffer also has unpredictable effects on the chaffer's efficiency and capacity. When filtering small seeds the angle of the louver is set as low as possible to allow the small seeds to pass into the clean grain collection system and prevent even slightly larger material other than grain from contaminating the collected clean grain. But the resulting restriction by the sieve of the air flow upwards to the chaffer starves the chaffer of needed air to function at a high capacity. To prevent overloading of the air starved chaffer, the operator must in turn slow the ground speed of the combine (thus decreasing the intake rate of the crop) or increase the speed of the cleaning fan to supply adequate air to the chaffer. Failure to do either will result in an overload condition on the top of the chaffer as is plugs with a mat of crop material. But increasing the fan speed, as discussed elsewhere, results in an undesirable loss of grain and also undesirable rethreshing of grain. Reducing ground speed and the rate of crop intake means that harvesting requires more time, which not only increases grain production cost but increases the chance that intervening events (time and weather, for example) may cause loss of a portion of the crop.

The reciprocating motion of the chaffer will also tend to move the mat of crop material (chaff, straw, stalks, and a percentage of grain) atop the chaffer rearwards out the discharge of the combine and waste whatever grain is mixed into the mat. If the operator attempts to prevent chaffer overload by increasing the fan output instead of reducing the ground speed of the combine, the sieve is over-driven with air and the grain is hit with a blast of air strong enough to blow into the tailings return auger and is needlessly rethreshed. As mentioned elsewhere, rethreshing of clean grain results in cracking and adds to the incoming crop from the harvester. When high levels of clean grain is returned to the thresher the ground speed of the combine must be reduced to prevent overload of the separator.

Other examples of such prior art combine chaffers include U.S. Pat. No. 5,041,059 issued on Aug. 20, 1991, to Ricketts et al, for "Cleaning System for a Combine" and U.S. Pat. No. 6,053,812 issued on Apr. 25, 2000, to Loewen et al for "Sieve Construction for a Combine Harvester". In the '059 patent, a series of openings 88 are designed to allow grain to fall through louvers 62. However, since the louvers 62 have a gap between them, "allowing clean grain to fall through the sieve" (column 7, lines 14,15), materials larger than openings 88 may penetrate the chaffer of the '059 reference. Having gaps witch allow the "clean grain" to fall through the "sieve" (the chaffer, despite the difference in naming convention) is both a drawback of the '059 patent and a distinction between that patent and the present invention.

A reference of interest is U.S. Pat. No. 5,176,574, issued on Jan. 5, 1993 to Matousek et al for "Combine Cleaning System". In the '574 patent, numerous one dimensional jets or passages in an "air foil" section of the chaffer themselves function as the holes of a screen. As shown in FIG. 5 (the representative diagram), the jets 88 are aligned in parallel rows. However, as stated in column 3, lines 7–9, and other places in the reference, the passages provide granular sizing or sorting capability. While it appears at first glance of FIG. 1 that there is a separate sieve section aft of the air foil section, FIG. 2 shows that the section extending rearwards of the air foil section is used for larger materials which are being sent back for rethreshing: this section of the chaffer overhangs return auger 52, which structure returns unthreshed materials to the threshing stage. This same point is made in column 3, lines 42–47, " . . . materials passing through the slat section get recirculated to the threshing apparatus." It is worth commenting that if the "airfoils" of this reference were to be interspersed among the slats, or vice-versa, the larger materials such as chaff, white caps or unthreshed heads of the grain plants, all requiring rethreshing, would not get rethreshed and would instead get mixed with the cleaned grain. It is also worth commenting that both the air foil/sieve holes and the gaps between the slats are located on the forward side of the troughs in which the airfoils sit, and that the airfoil openings 88 would continue to function as a sieve themselves no matter how the '574 reference is rearranged, as that structure and purpose is repeatedly taught in the reference, as pointed out above.

In general, the goals of combine chaffer designs are to first, allow a high capacity chaffing rate, that is to allow a high flow rate of partially threshed materials into and through the chaffer. This is of importance because the chaffing rate tends to be limiting factor in combine operation speed: increasing the chaffing capacity rate allows an immediate increase in combine operation. Second the chaffer must work efficiently to separate the grain from the chaff. High capacity of operations means little if the market quality of the grain is degraded substantially by the presence of excess chaff. These two goals may conflict.

In functional terms, turning up the air blast allows faster operation of the chaffer, up to that point when the air blast merely causes grain to be blown out the back of the combine with the chaff. This in turn leads to the observation that two separate operations are occurring in the chaffer: one operation is that grain is being separated, allowed to fall through the sieve, and collected. The other operation is that chaff is being blown backwards over the sieve and eventually out the back of the combine. (A third operation, alluded to earlier, is that unthreshed heads of grain are being collected for rethreshing.)

Another more practical problem with known chaffer designs is that of access to the chaffers and/or sieves, as well as adjustment, replacement, and cleaning. The combine has evolved into a complex machine with attachments such as grain loss monitors, chaff spreaders and straw choppers located at or near the discharge opening of the combine. These extra attachments make access to the chaffer difficult and requiring extensive time consuming disassembly to remove the chaffer and sieve. Thus whenever the chaffer must be changed, cleaned, adjusted or for any other routine maintenance, a good deal of effort is involved. In fact, the chaffer is normally only accessed from the rear, and the weight of any material clogging the chaffer, plus the weight of the chaffer and frame, plus the fact of access to one end only, all conspire to make pulling or adjusting the chaffer/sieve a tedious and difficult two person operation.

SUMMARY OF THE INVENTION

The present invention uses a series of substantially-uninterrupted precision lateral horizontal air jets that focus the air blast, supplied by the cleaning fan, into a thin, high velocity layer of air which approximately parallels the faces of the screens, rather than being primarily emitted from the orifices of the screens.

It is one feature of the invention that the air blast is directed above the screens, and so in addition to not passing through the screens also does not pass directly across the face of the screens.

In another embodiment of the invention, the faces of the screens are divided into a series of steps or troughs, in which the riser of each step (which riser may also be regarded as the front side of each trough) has at least one of the series of lateral horizontal airjets. Grain supplied to the first riser is pushed rearward by the face of the riser and by the thin layer of high velocity air streaming through the air jet. The effect of gravity causes the grain to penetrate the thin air stream and fall on the screen of one of the step/troughs. The angle of the screen faces the approaching grain and is selected so as to favor grain penetration. The grain on the screen is normally entirely below the thin high velocity air blast. As the screen is not the source of the air blast the grain is able to enter the openings of the screen without ever directly facing a strong air blast.

It is thus one additional aspect of the present invention that the grain does not have to reverse direction as it must in the louver or air foil chaffer/sieve designs. Since the grain does not have to fall directly against the air blast, the fan speed can be increased without blowing the grain out with the chaff or into the tailings return system.

It is another aspect of the present invention that as the fan increases in speed, back pressure is created inside the plenum (the area beneath the air jet chaffer). The back pressure causes air to rise through the screens. However since the screens are fixed at an angle parallel to air streaming from the cleaning fan directly toward the air jets, and since the holes in the screens are not designed as air jets, the air exhausting through the screen holes is at a much lower velocity than that from the air jets. The velocity of the air exhausting through the screen holes is sufficient to prevent chaff and other light material such as dust from entering the clean grain collection system. Such light material will be driven by vibration and air flow over the next riser and as it falls to the next trough/step, it will pass the next air jet and be lofted away from the screens.

It is a further feature of the present invention that any grain that bounces off the surfaces between the screen holes moves by inertia rearward to the next riser and thus the next series screen holes, until it penetrates a screen hole.

It is a further feature of the present invention that the air blast need not be powerful enough to drive grain substantially rearward, as the "step and riser" architecture of the present invention assists the grain's rearward travel.

In another embodiment of the present invention, the functions of sieve and chaffer are combined on the chaffer by means of two different structures: air jets and chaffing screens.

In another embodiment of the present invention, the air jets are longitudinally constricted in cross section so as to increase the speed of air flow there through and thus increase the air blast created.

It is a further aspect of the present invention that screen hole size and shape may be selected without regard to a "filtering" function by the screen, as such filtering occurs above the screen.

It is a further aspect of the present invention that the air jet openings are not needed or used for grain separation.

In another embodiment of the present invention that the chaffer on the combine may be changed on an element by element basis, rather than by changing the entire chaffer.

In another embodiment of the present invention, the air jet openings and screen hole openings may be of fixed size and configuration so as to eliminate the need for frustrating and error-prone adjustment of louver configurations of prior art systems.

It is a feature of the present invention that lower cost chaffers may be manufactured which allow exacting standards for production and provide precision operation.

It is another feature of the present invention that white caps may be caught with a high degree of efficiency without the need for precision sifting.

It is a feature of the present invention that low cost chaffers which do not require any adjustment may be used, each chaffer being optimized to one grain type.

DETAILED DESCRIPTION OF THE DRAWINGS

The present invention teaches the use of at least one air jet dedicated to the task of blowing chaff, white caps, crop heads, straw, dirt and other debris and having themselves no filtering function, interspersed with screens which easily allow passage of grain of the correct size. The grains with which the present invention may be used include, but are not limited to, wheat, millet, sunflowers, canola, milo, barley, oats, corn, popcorn, rye, beans, flax seed, sorghum, soybeans, dry edible beans, dried peas, food grains, feed grains, oil seeds, genetically altered grains, rice, faba beans, radish seeds, and other crops of various sizes. For example, canola seeds are typically two millimeters or less in size (very roughly 1/12th of an inch) while faba beans may average an inch or more in size. Radish seeds are even smaller. This wide range is made possible by providing non-adjustable chaffers which may be easily replaced by one man and which are optimized for a given size of grain.

Figure 1:
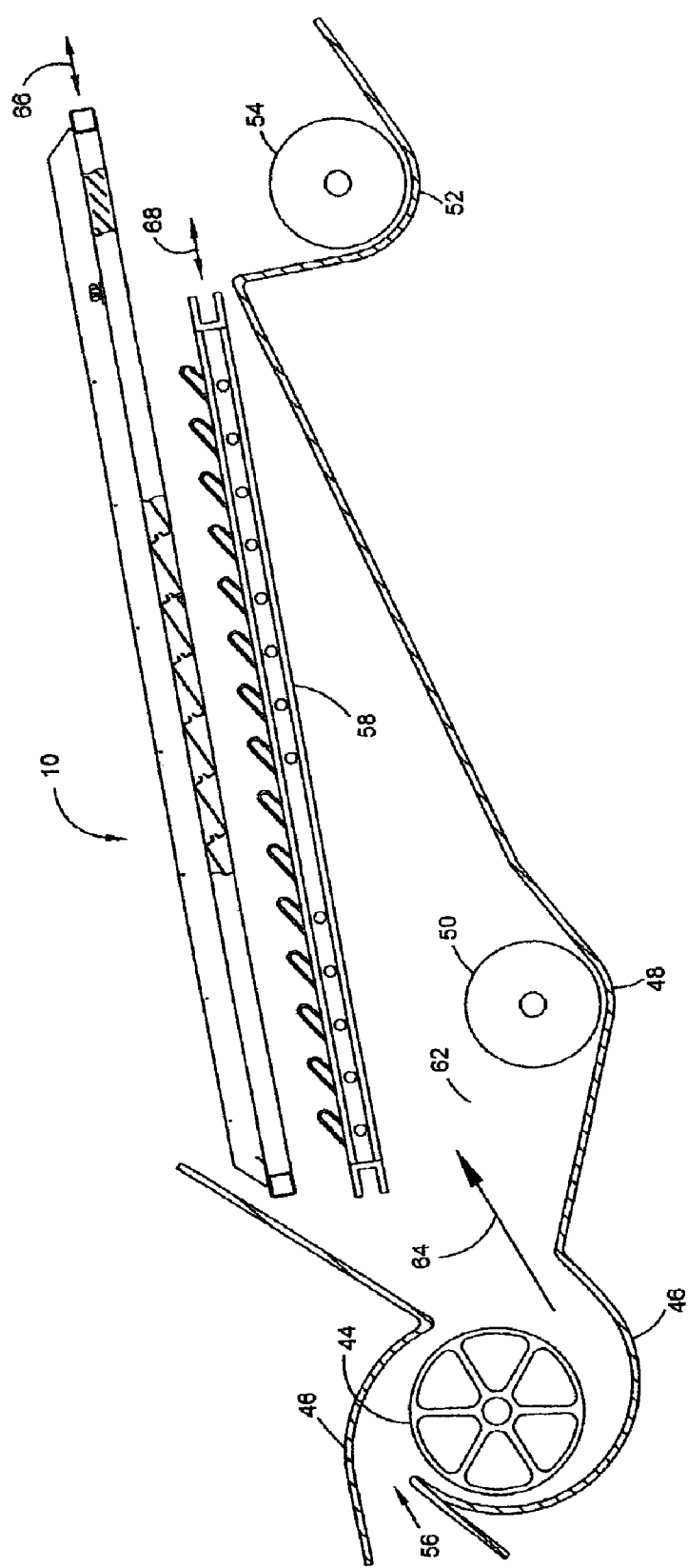
FIG. 1 is a cross sectional view of the plenum of a combine showing in double partial cross sectional view a high capacity air jet chaffer according to a first embodiment of the present invention.

FIG. 1 is a cross sectional view of the plenum 62 of a combine showing in double partial cross sectional view high capacity air jet chaffer 10 according to a first embodiment of the present invention. Chaffer 10, the invention, sits above sieve 58 of known type. Arrows 66 and 68 indicate the reciprocation of chaffer 10 and sieve 58. Usually, chaffer 10 and sieve 58 move in opposite directions. Arrow 56 indicates the air intake into cleaning fan 44 located in fan housing 46, while arrow 64 indicates the airflow through plenum 62. Note that chaffer 10 shown in a double partial cross sectional view: the first cross sectional view illustrates the interspersed air jets and screens of the invention; the second cross sectional view illustrates the (known) rethresh louvers which allow unthreshed materials to be taken back to the threshing stage (not shown) for rethresh and return to chaffer 10.

In operation, intake airflow 56 flows through cleaning fan 44 to enter plenum 62 as air flow 64. Air then flows through sieve 58 in a manner known in the art, then flows through chaffer 10 in a manner unique to the invention.

Threshed grain and other materials cascade down onto chaffer 10 from the threshing stage (not shown). Normally, this will be a continuous stream of grain, straw, chaff, dirt, unthreshed or partially threshed grain heads, and other materials, however, this stream may from time to time be interrupted or may vary in volume depending on the crop density of the areas being harvested, in a manner which is sometimes unpredictable. The invention, chaffer 10, will blow the lighter and less dense materials backwards from that portion of chaffer 10 having jets and screens. The lightest materials, chaff, straw, etc, will simply be lofted entirely over the end of chaffer 10 and will depart the aft end of the combine. Those materials of intermediate weight such as partially threshed heads, unthreshed heads, white caps and the like will only be lofted over the portions of chaffer 10 having air jets. The aft/rearward section of chaffer 10 having rethreshing louvers, however, will allow these materials to fall through chaffer 10 to tailings auger trough 52, at which location tailings auger 54 will return them to the threshing stage (not shown) for rethreshing. Should any such materials manage to pass chaffer 10, they will nonetheless be conveyed to auger trough 52 by sieve 58.

The heaviest/densest materials, however, will be the properly threshed grain. This will fall through chaffer 10 and sieve 58, through plenum 62 to clean grain auger trough 48. There, clean grain auger 50 will begin the process of moving the clean grain to a storage bin (not shown) located atop the combine or in another vehicle paralleling the combine.

Tests have confirmed that the clean grain does not block chaffer 10 from the "bottom" side. Without wishing to be bound by any one theory, it is believed that the pressure in plenum 62, and thus the draft within (air flow 64) is slow enough that the grain's trajectory is not impacted and the grain does not get sucked upwards from below into the air jets or apertures.

In this embodiment, chaffer 10 may be employed without the use of sieve 58. This is possible because the cleaning efficiency and cleaning capacity of chaffer 10 greatly exceeds that of previous chaffers.

Figure 2:
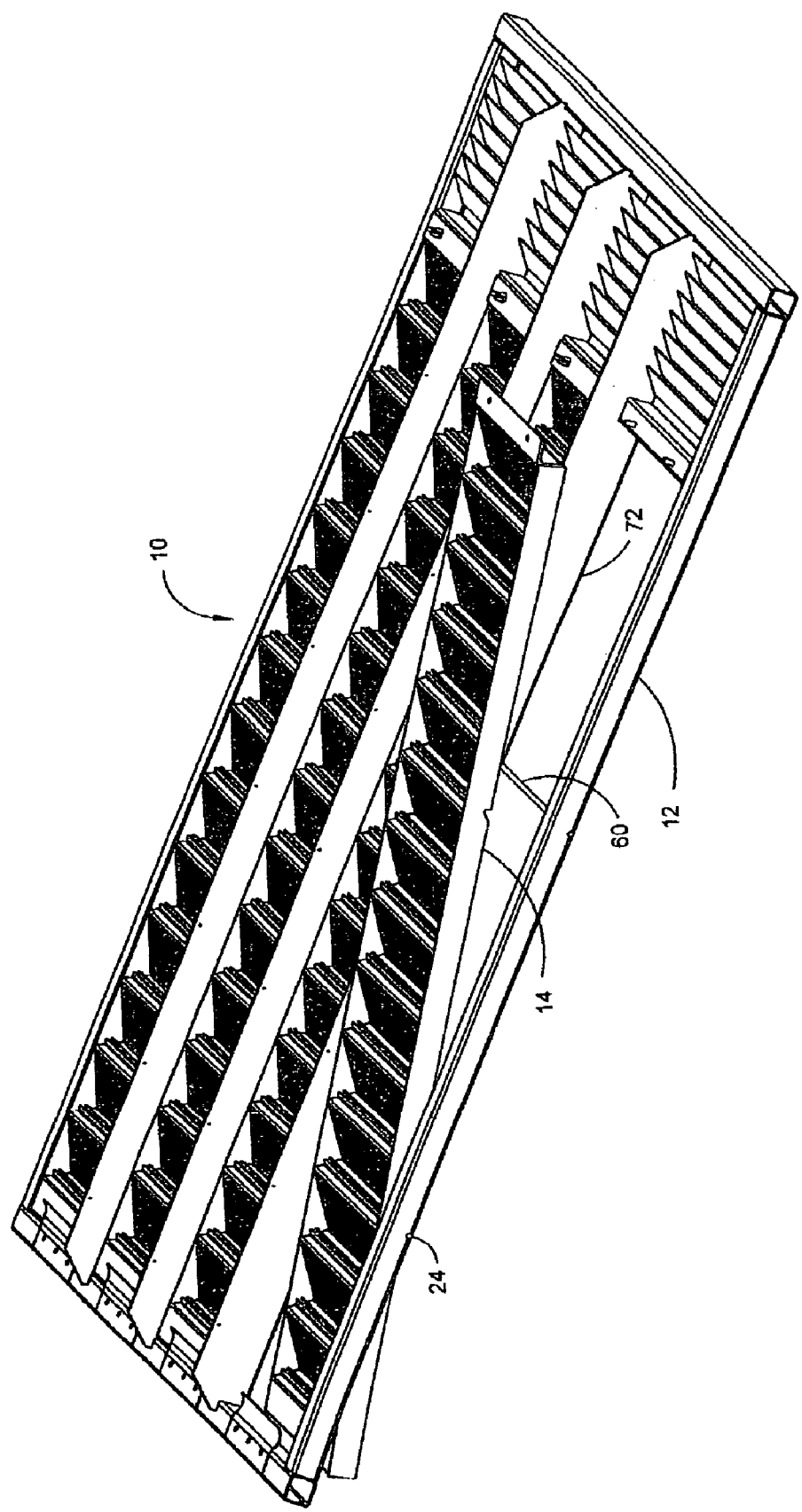
FIG. 2 is a three dimensional perspective view of a chaffer according to a second embodiment of the present invention.

FIG. 2 is a three dimensional perspective view of chaffer 10 according to a second embodiment of the present invention. This embodiment is interchangeable with the first embodiment of the invention, except as noted below.

In this embodiment, the chaffer is composed of a number of chaffing elements as exemplified by chaffing element 14. The chaffing elements in general are "coterminous" in the sense that they are located substantially side by side with only small gaps or no gaps between the elements, the elements and the baffles, etc. Baffle 72 divides chaffer 10 longitudinally between the elements. The purpose of baffle 72 is to prevent grain from sliding laterally across chaffer 10 when the combine is operating in a "sidehill" condition, i.e. on the side of a hill. The length and width of chaffer frame 12 may be entirely taken up by combined element lengths and element widths of the chaffing elements, or, as in the presently preferred embodiment, there may be additional features within the chaffer frame 12, such as the rethreshing louvers. Chaffer frame 12 also defines chaffer length and chaffer width of chaffer 10. Chaffing element 14 may be removed without removing the remainder of chaffer 10. While removal of chaffer 10 is a two person job requiring access to the interior of the combine from the back, removal of one chaffing element somewhat simplifies this task. Each element is much lighter and smaller, making the removal of ancillary equipment less necessary and rendering the task of altering chaffer 10 so much easier and quicker as to make it a one person job.

One motivation for known designs to teach chaffers and sieves having adjustable louvers was the desire to avoid changing of the chaffers when going from crop to crop. However, by rendering the changing of chaffer 10 easier, the present invention teaches that having specialty chaffers for each crop is again possible. This ends the guesswork in chaffer adjustment, in which louvers which are maladjusted either reduce chaffing capacity or else blow grain onto the ground behind the combine. The reason that the changing of chaffer 10 is easier, of course, is that frame 12 of chaffer 10 is not actually normally changed. Instead, individual ones of a plurality of coterminously positioned removable chaffing elements (such as element 14) are changed, a much easier task.

Element support rod 60 retains element 14 in place from the bottom, as will be discussed further below.

Figure 3:
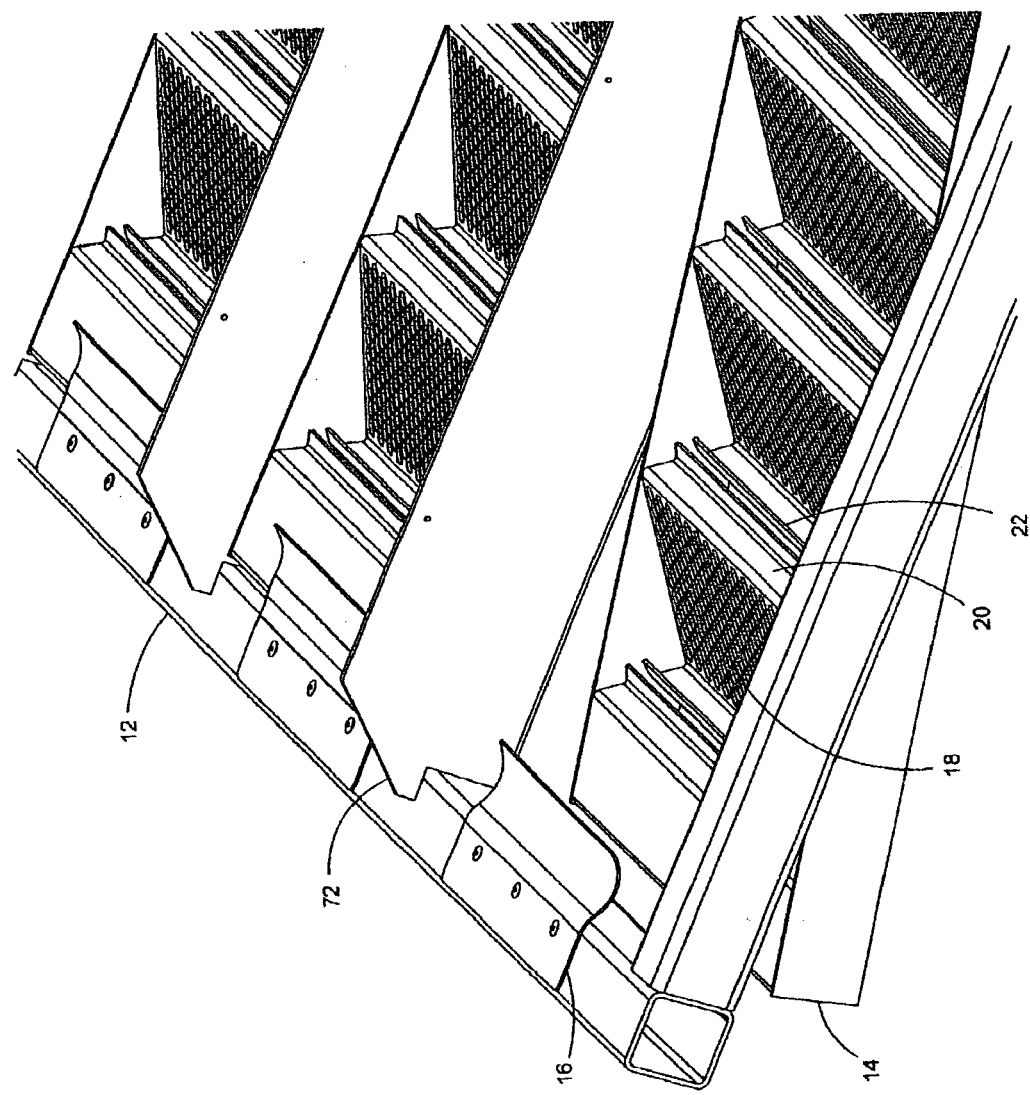
FIG. 3 is a partial three dimensional perspective view of the second embodiment of the chaffer.

FIG. 3 is a partial three dimensional perspective view of the second embodiment of chaffer 10. As may be seen, the front end of chaffer 10, which is the end most deeply within the combine, has mounted upon chaffer frame 12 spring clip 16 which impels the front end of element 14 downwards when element 14 is being removed or inserted. This greatly assists the removal or insertion.

FIG. 3 also shows details of the air jet 22, riser 20, and chaffing screen 18. Element 14 is generally formed in a "staircase" cross section, that is a plurality of steps each having a riser portion and a tread portion. The riser of each step of the "staircase" is riser 20, the tread of each step is chaffing screen 18. The risers each adjoin the screens and in the preferred embodiment are substantially perpendicular thereto. Air jet 22 is located at a distance from the joint of screen 18 and riser 20, whereby the air blast parallel to screen 18 is displaced from screen 18 by the same distance.

It will be remembered that in many combines, chaffer 10 will actually slope upwards towards the rear (as shown in FIG. 1), or be roughly horizontal, in addition to uses in which it slopes downwards towards the rear, as shown in FIG. 3. A trough portion (that volume in the angle of the step below air jet 22 and running across the lower elevations of screen 18) is also present. The trough portion is caused by the fact that air jet 22 is positioned, in the preferred embodiment, at a distance above screen 18, by which means the air blast from airjet 22 is not directed across the face of screen 18 but rather just above the face of screen 18. This distance may be varied or eliminated in other less preferred embodiments of the invention.

The word screen, as used herein, is understood to mean a regular pattern of apertures characterized by a relatively high percentage of surface area being aperture and a relatively low percentage of the surface area being support structure between apertures. Less generally, a screen for these purposes will have a surface in which approximately 25% or more of the surface is aperture. Specifically, the screen should comprise an apertures of 40–90% of the surface area, most preferably, 60–80% of the surface area. In particular a single line of holes which together comprise less than 10% of the surface area is obviously not a screen as the term is used herein.

The important factors in determining the screen aperture size and the density or compactness of the apertures are the size of the grain and the ability of the manufacturing facility to leave sufficient material between the screen apertures for a sturdy construction and a durable product. The size of the screen itself is determined, as will be explained below, by the "range" of the individual air jets, that is, their ability to blow materials from step to the next and thus into the air blast of the next air jet.

Features of the present invention are clearly illustrated by FIG. 3. First, as a plurality of air jets are dimensioned and configured to provide the "air blast", the air blast function is carried out by a structure which is entirely separate from the structure which carries out the "sifting" "sieving" or "filtering" function, that is, a plurality of screens positioned between the air jets, i.e. chaffing screen 18. Thus the air blast which is used to separate the grain from the chaff is NOT emitted by the plurality of apertures in chaffing screen 18, and the plurality of apertures may be dimensioned and configured to admit such crop without other function, and thus a relatively easy passage for grain is allowed through screen 18. In addition, in the presently preferred embodiment and best mode presently contemplated for carrying out the invention, air jet 22 is in fact small enough in the vertical dimension to prevent passage of grain.

A second feature of the present invention is well illustrated by FIG. 3. This is the fact that the air blast (not shown) is not parallel and/or opposed to the flow of grain through the apertures of screen 18, and is not parallel to the sides of the apertures of screen 18, but rather is perpendicular to the flow of grain and is further perpendicular to the plurality of apertures of screen 18 and parallel to screen 18 itself. This configuration is made possible by the feature mentioned in the preceding paragraph, that the air blast is generated by a structure separate from the apertures of screen 18.

The air jet 22 used in the preferred embodiment is a "two dimensional" nozzle or "linear air jet" which stretches laterally, substantially across the width of an individual chaffing element, for example, from one side of element 14 to substantially the other side of element 14 as a substantially or wholly unbroken (continuous) nozzle. In other embodiments, this configuration may be altered.

Figure 4:
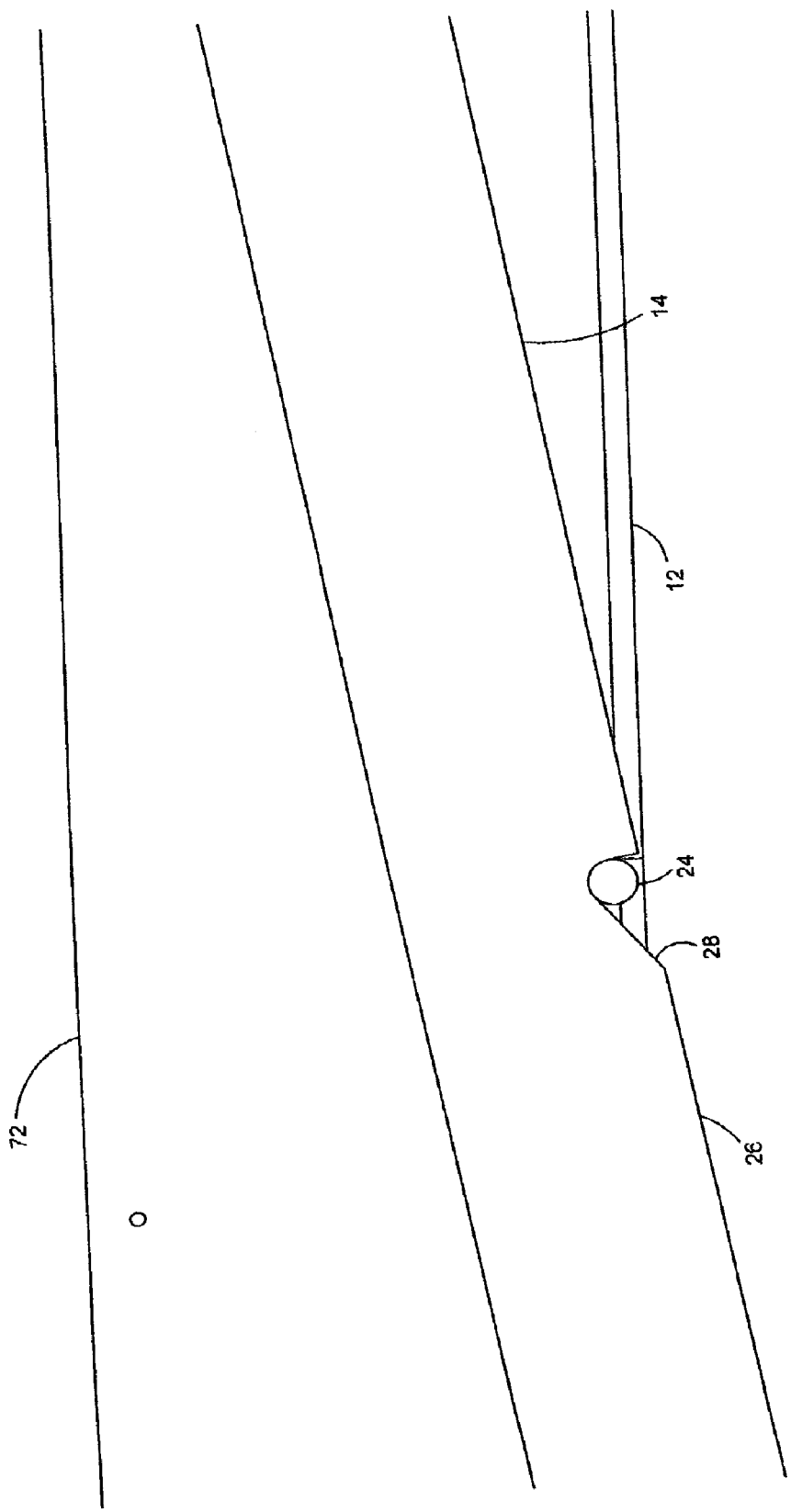
FIG. 4 is a frame-removed side view of the chaffer, showing an element of the chaffer positioned for removal or insertion, according to the second embodiment of the invention.

FIG. 4 is a frame-removed side view of chaffer 10, showing element 14 positioned for removal or insertion, according to the second embodiment of the invention. Chaffing element 14 has element frame 26, not to be confused with chaffer frame 12. Element frame 26 has alignment notch 28, dimensioned and configured so as to engage hinge pivot 24. In the presently preferred embodiment, hinge pivot 24 is a bar or tube stretching laterally across the width of chaffer 10. During insertion of element 14 into chaffer 10, the front end of element frame 26 may be rested on hinge pivot 24 and slid deeper into the combine until notch 28 engages hinge pivot 24. The operator will immediately receive positive tactile feedback that element 14 is in the correct placement. In addition, the engagement of alignment notch 28 with hinge pivot 24 will help hold chaffing element 14 securely in place within frame 12 of chaffer 10. Referring back to FIG. 3, it will be seen that the next step in inserting chaffing element 14 into chaffer 10 is to raise the front end of element 14 by lowering the rear end (not depicted in FIG. 3 or FIG. 4) until the front end of element 14 pushes spring clip 16 and seats itself there against. When element 14 is properly seated within frame 12, spring clip 16 urges element 14 away from the frame. Note that spring clip 16 may be many types of equivalent spring, or other equivalent device, and need not only be a relatively flat spring clip.

Element support rod 60 (FIG. 2) and hinge pivot 24 will both act to retain element 14 within frame 12. Note that element support rod 60 and hinge pivot 24 are structurally both rods running across the width of chaffer 10, however, hinge pivot 24 is used to align element 14 and rotate it into place.

Figure 5:
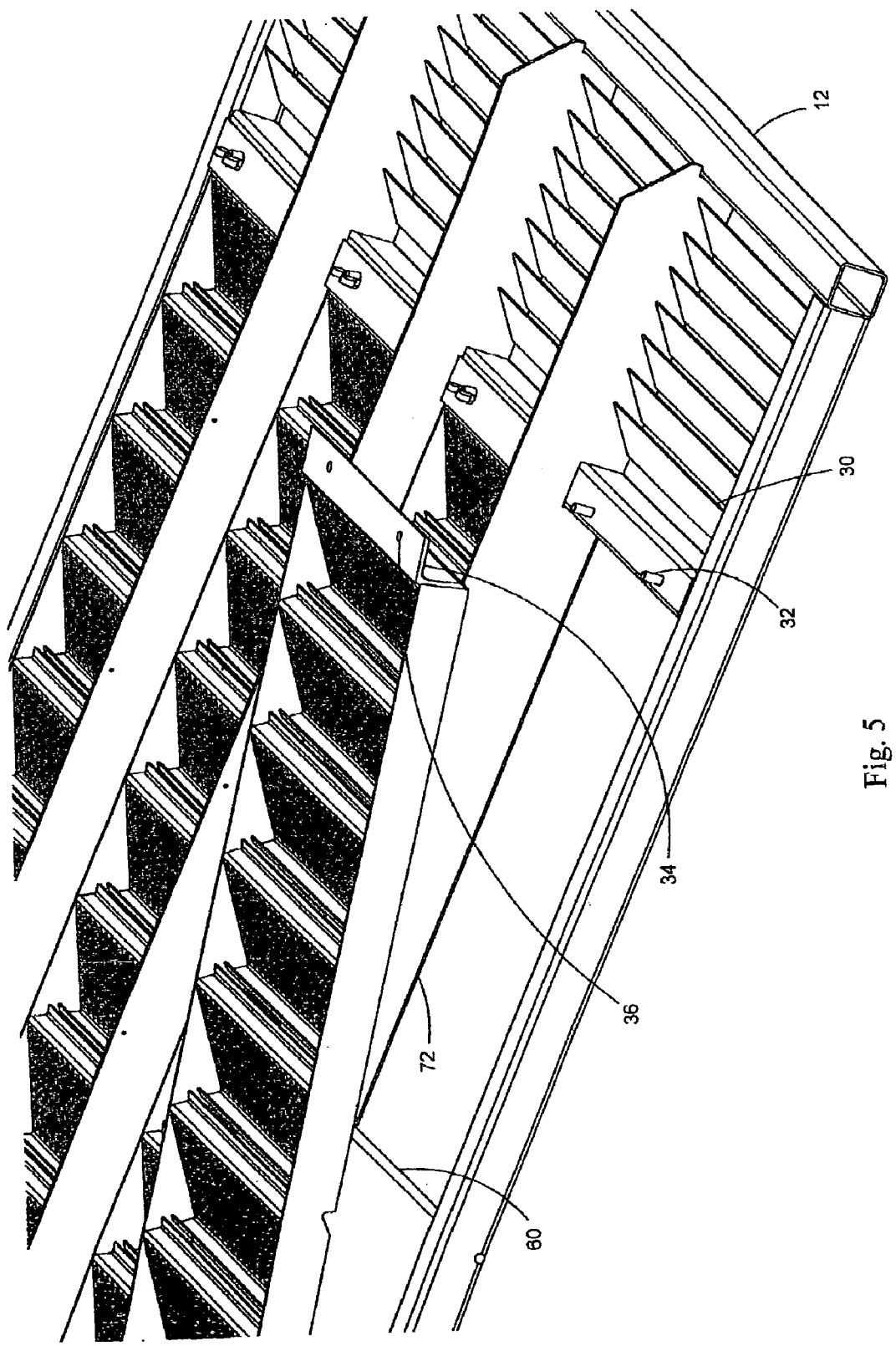
FIG. 5 is a partial three dimensional perspective view of the second embodiment of the chaffer.

FIG. 5 is a partial three dimensional perspective view of the second embodiment of chaffer 10. As may be seen, the rear end of chaffing element 14 has hold down flange 34 have hole 36 there through. The second step in insertion of chaffing element 14 into chaffer 10, raising the front end and lowering the rear end, causes hole 36 to pass over hold down bolt 32. Hold down bolt 32 is set into a cross member of frame 12.

As will be readily apparent, spring clip 16 holds the front end of element 14 down, hinge pivot 24 and element support rod 60 hold the element up, and flange 34 will hold the rear end of element 14 up. Thus, element 14 is held in place securely, yet is easy to remove and replace, and furthermore is automatically guided into the proper position.

Another feature of the second embodiment of chaffer 10 may be seen by reference to FIG. 5. Rethresh louver 30 is a louver such as known in the art, which allows materials too large to pass screen 18 to fall through the rearmost section of chaffer 10. This material, white caps and other unhusked or unthreshed material containing grain is, as discussed with reference to FIG. 1, taken by tailings auger 54 back to the threshing stage (not shown) for rethreshing, after which, it is again sent over chaffer 10 for chaffing.

Although not shown, chaff and other loose, light materials will simply be blown upwards and backwards away from high capacity air jet chaffer 10 and thence out of the rear end of the combine, possibly assisted by other devices known in the art.

Figure 6:
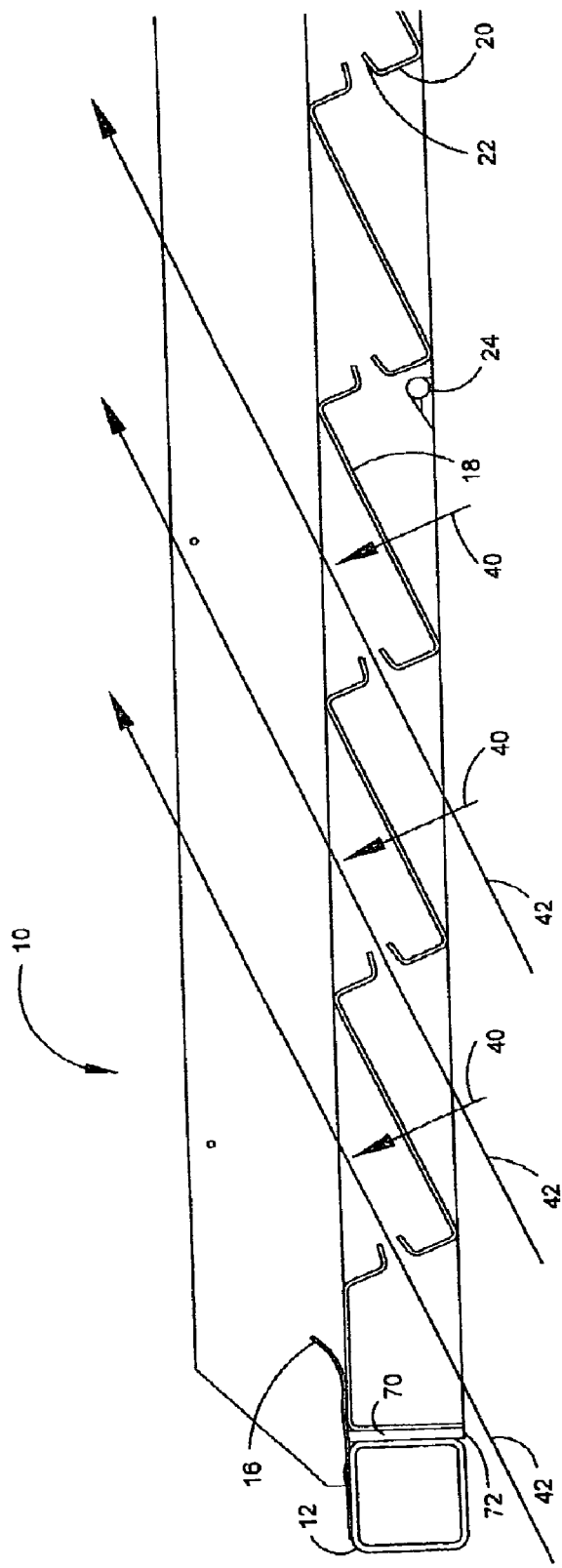
FIG. 6 is a side view of the second embodiment of the chaffer (chaffer frame removed and element frame removed), showing the multiple air flows through the chaffer and the structure of the chaffer element.

FIG. 6 is a side view of the second embodiment of chaffer 10 (with chaffer frame 12 removed and element frame 26 removed), showing the multiple air flows through chaffer 10 and the cross sectional structure of chaffer element 14. Screen 18, riser 20 and jet 22 all influence the flow of air through element 14. Arrows 40 indicate the air flow due to back pressure in plenum 62 (not shown), this flow is generally of low speed, as the substantial open areas of screen 18 (as suggested earlier, 25% or more of the surface area is preferable, 40–90% more preferable, and 60–80% most preferable) do not allow a build up of great back pressure.

Arrows 42 indicate the air flow due to fan 44 (FIG. 1). Air jet 22 is approximately parallel to air flow 42 even before air flow 42 passes through air jet 22. Note that this is not a requirement of the invention: air jet 22 may be positioned at a substantial angle to air flow 42 and yet still be dimensioned and configured so as to provide a satisfactory air blast, however in the preferred embodiment and best mode presently contemplated for carrying out the invention, the angle between air flow 42 and air jet 22 is not large.

As used herein, the word "jet" is used to mean more than a simple gap or louvered opening. Louvers, as commonly used in the prior art, are parallel plates which simply redirect an air flow through the gap between without otherwise altering it. A "jet" as used herein, however, utilizes both the forced draft from a fan (such as fan 44) and also the pressure difference between inlet and outlet to generate an air blast which is more powerful (in the path of the blast downstream) than the air flow into the jet on the upstream side. Reference to FIG. 6 shows that the area of riser 20 is substantially greater than the area of airjet 22. This assists air jet 22 in developing a more powerful air blast. In addition, in the embodiment pictured, air jet 22 narrows from base to outlet, thus causing an increase in air velocity from the nozzle. Thus, the proportionate difference in area between the nozzle and the base of air jet 22 is added to the proportionate difference in area between the nozzle and riser 20, and further is added to the air speed already present due to the effects of fan 44 (FIG. 1) and the result is an air blast across the face of screen 18 which relatively very strong in comparison to the air flow through screen 18. In particular, in the presently preferred embodiment of the invention, the angle of exhaust of the plurality of air jets approximates the angle of air flow from such fan. In other embodiments (not pictured) the air jet may have parallel walls from base to outlet, or even may widen. Such alternative embodiments may offer advantages in terms of staying clear and unclogged. In other embodiments, the air jets may be positioned to have an angle of exhaust substantially different from that of the fan, or have other air moving structure than the fan by which means the jets develop the air blast.

As previously mentioned in the preferred embodiment air jet 22 is dimensioned and configured so as to be too small to allow entrance of grain there through, however, this entrance may be prevented by other means. In the preferred embodiment, the air blast from air jet 22 is also too powerful to admit grain. Other structure may be used, for example, physical bars to entry. As previously mentioned, for wheat, the air jet of the preferred embodiment is presently manufactured to have a gap of $3/16$ inch. The width of the air jet may be of other dimensions, however, as long as it is dimensioned and configured to substantially alter the trajectory of the chaff, straw, stems and other light weight MOG falling into its air blast. In addition to grain size and desired power, the width of the air jet may be varied so as to avoid clogging of the air jet by grain, chaff, dirt and other materials.

Air jet 22 may also be positioned elsewhere than shown by FIG. 6. For example, air jet 22 may be positioned further up the side of riser 20. In this event, the separation of the air blast generated by airjet 22 and the mat of material atop screen 18 is increased. Airjet 22 may also be positioned lower down on riser 20. This may be useful in applications designed for crops of differing sizes, or may be implemented for other reasons.

For purposes of this application, an "air blast" is thus any air flow which is powerful enough to substantially alter the trajectory of relatively low density materials falling through it. In the preferred embodiment, the air blast is in fact powerful enough to prevent the entrance of grain into the air jet. Normally, such air blasts will be forced by a fan (or conceivably induced by a fan) and/or by an air jet. This is by contrast to the relatively weak airflow which may be experienced through the plurality of apertures of a screen. A screen having a plurality of apertures covering a substantial portion of the surface area of the screen relatively weak flows are caused by back pressure inside a plenum such as plenum 62. Such a relatively minimal airflow will not impede the passage through an aperture of grain. In the present invention, the term "minimal" airflow includes no airflow at all through the apertures.

Another feature of the present invention is illustrated by FIG. 6. In contrast to prior art chaffers in which the largest apertures through which grain can fall are the louvers themselves (such as the '059 patent) or in which the louvers themselves are the only apertures though which the grain can fall (the '574 patent and other references cited), and thus the air blast cannot be powerful enough to entirely shield the apertures, in the present invention, the air blast shields the only apertures which accept grain by virtue of forcing itself across the face of the apertures perpendicular to the fall of the grain. Thus, a more powerful air blast is permissible without preventing the apertures of the chaffer from allowing the grain passage. The lower density chaff is more susceptible to being blown off of a falling trajectory than the grain, and when so blown, it is likely to cross from one step to the next and be caught by a second air blast, and by this means eventually reach the end of the chaffer. In the presently preferred embodiment, the distance between two risers (also equivalent to the length of each screen) is roughly 3 to 4 inches. This may be thought of as being the "range" of the airjet, and the screens may be made a length which allows the combined airjets in series to maintain an acceptable air velocity across the length of chaffer 10. The length of the screen is thus related to the range of the airjet in any given condition.

The reciprocating/vibratory motions of chaffer 10 further causes riser 20 to push against whatever grain may be lying atop screen 18, sending any such grain upwards across screen 18 and providing it with further chances to achieve the correct orientation to fall there through.

While the structure disclosed in the preferred embodiment relies upon jets which are at a modest angle to the air flow from the fan and screen apertures which are perpendicular thereto, other equivalent ways of generating a strong air blast from a source other than the screen apertures will be readily apparent to those skilled in the art after reading this disclosure. And while the best mode presently contemplated relies upon air blasts which are substantially perpendicular to the screen apertures (and parallel to the screen faces) other equivalent angular arrangements may also fall within the scope of the appended claims.

A practical feature of the invention which is also depicted in FIG. 6 is gap 70 between flame 12 and element 14 seen below spring clip 16. Since unlike prior art chaffers, element 14 may be removed and replaced from time to time, there must be gap 70 to allow element 14 to swing out when being removed and replaced. Gap 70 is small enough to prevent grain entry or passage there through. In some prior art chaffers which sit on rails or tracks, the gap all around the prior art chaffer fills with dirt and chaff and prevents the chaffer from seating properly unless the rail or track is thoroughly cleaned at the time of changing chaffers. In the present invention, the only location at which dirt or chaff can accumulate is the extreme rear of the chaffing element, under flange 34. That location, however, is easily accessible to the operator.

Figure 7:
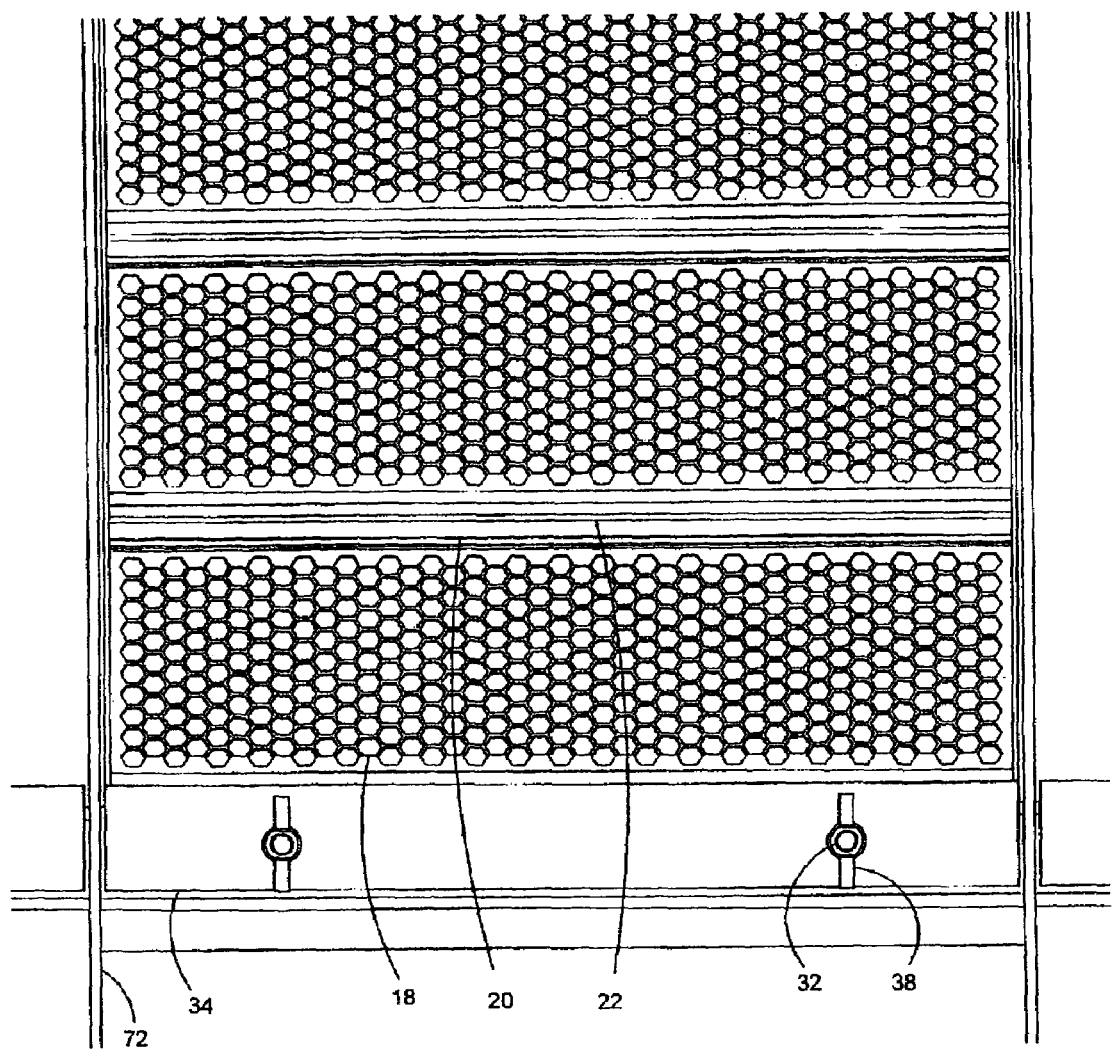
FIG. 7 is a partial top view of a third embodiment of the chaffer, partially showing one element thereof and further showing the retainers and the screen and holes of the element.

FIG. 7 is a partial top view of a third embodiment of chaffer 10, partially showing one element thereof and further showing retainer 38 and details of screen 18.

At the rearward end of element 14, hold down flange 34 has hole 36 (see FIG. 5) which fits over hold down bolt 32. Retainer 38 is then placed on hold down bolt 32 to secure element 14 in place against the resistance of spring clip 16. Once in place, element 14 is held by spring clip 16 at the front end, hinge pivot 24 and element support rod 60 in the middle, and retainer 38 at the rear end. Thus element 14 is sandwiched into frame 12 so as to avoid vibration. Spring clip 16 also helps compensate for wear or warp to avoid rattle.

While the drawings depict a bolt and a wing nut, many other equivalent retainers may be used for this function which will accomplish the same result in the same way.

Details of screen 18 are also visible in FIG. 7. As shown, screen 18 has a regular pattern of hexagonal holes. However, the holes may be round, square, polygonal, irregular or other shapes as appropriate for the grain for which the chaffing element 14 is optimized. The size of the holes may also vary depending upon the grain, as may details of the construction of the screen such as thickness, material, hole pattern, and so on. The surface area of the screen should be substantially taken up by the apertures/holes, so as to allow grain flow there through at the highest possible rate. Thus many other equivalent screens may be used for this function which will accomplish the same result in the same way.

The invention does not rely on critical openings to achieve satisfactory separation of fully threshed and unthreshed grain and material other than grain. Screen hole size and shape is selected to be slightly larger than the largest grain in any particular crop. Material other than grain, such as chaff and straw, is less dense than grain and is blown rearward by the high velocity air streaming from the air jets and is thereafter discharged out the back of the combine. Since the air jets openings are not needed nor used for grain separation, the opening is fixed and relatively narrow. This eliminates the frustrating job of precise settings of adjustable louvered or air foil designs which also interacts with and effects the air flow.

In view of the fact that the grain is essentially cleaned before reaching screen 18, and the fact that screen 18 may be properly sized at the time of manufacture without need for operator adjustment, the high capacity air jet chaffer diminishes the need to rely on the sieve located lower down in plenum 62 for thorough cleaning of the grain. In fact the sieve can be removed or set wide open with no degradation in grain quality. As a practical matter, using a sieve restricts the flow of air needed by the chaffer, thus operators may advantageously remove sieves even from combines which have two or more levels of chaffing, thus increasing the efficiency of airflow and chaffing capacity, and doing so without losing any efficiency in the cleaning process.

In the embodiment depicted, the invention is optimized for wheat, and thus the holes in the screen are ¼ inch hexal holes while the nozzle width is 3/16 inch. However, if the device were to be optimized for use with faba beans, for example, the nozzle width may be ½ inch and the apertures 1 inch across. Were canola to desired crop, the aperture size may be ⅛ inch.

Any grain that is still unthreshed from the seed head of the plant, attached to the cob, or in the pod; remains too large to pass through the screen holes and is advanced rearward (due to being pushed by the risers) until reaching the louvered section above the tailings collection system. These unthreshed heads, cobs, or pods pass through the louvers into the tailing system and are returned to the thresher for additional threshing until fully threshed.

This disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A combine crop chaffer comprising:

a chaffer frame having a length and a width, and a plurality of longitudinally rotatable coterminously positioned removable chaffing elements disposed within the chaffer frame, wherein the chaffer frame further comprises a lateral hinge pivot; and further wherein at least one of said chaffing elements further comprises an element frame, the element frame having an alignment notch therein, the alignment notch being dimensioned and configured to engage the hinge pivot when the chaffing element is properly positioned within the chaffer frame and further dimensioned and configured to allow the chaffing element to then be rotated about the lateral hinge pivot until it is properly oriented within the chaffer frame, and a spring located upon the chaffer frame, the spring dimensioned and configured to engage the front end of at least one the plurality of chaffing elements when the chaffing element is properly seated within the chaffer frame, and the spring further urging the front end of the engaged chaffing element to rotate away from a seated position within the chaffer frame.

* * * * *